3,087,782
RECOVERY OF METAL VALUES FROM
LITHIUM ORES
Thomas H. Whaley, Mount Vernon, N.Y., assignor to Texaco Development Corporation, New York, N.Y., a corporation of Delaware
Filed Dec. 23, 1959, Ser. No. 861,633
6 Claims. (Cl. 23—89)

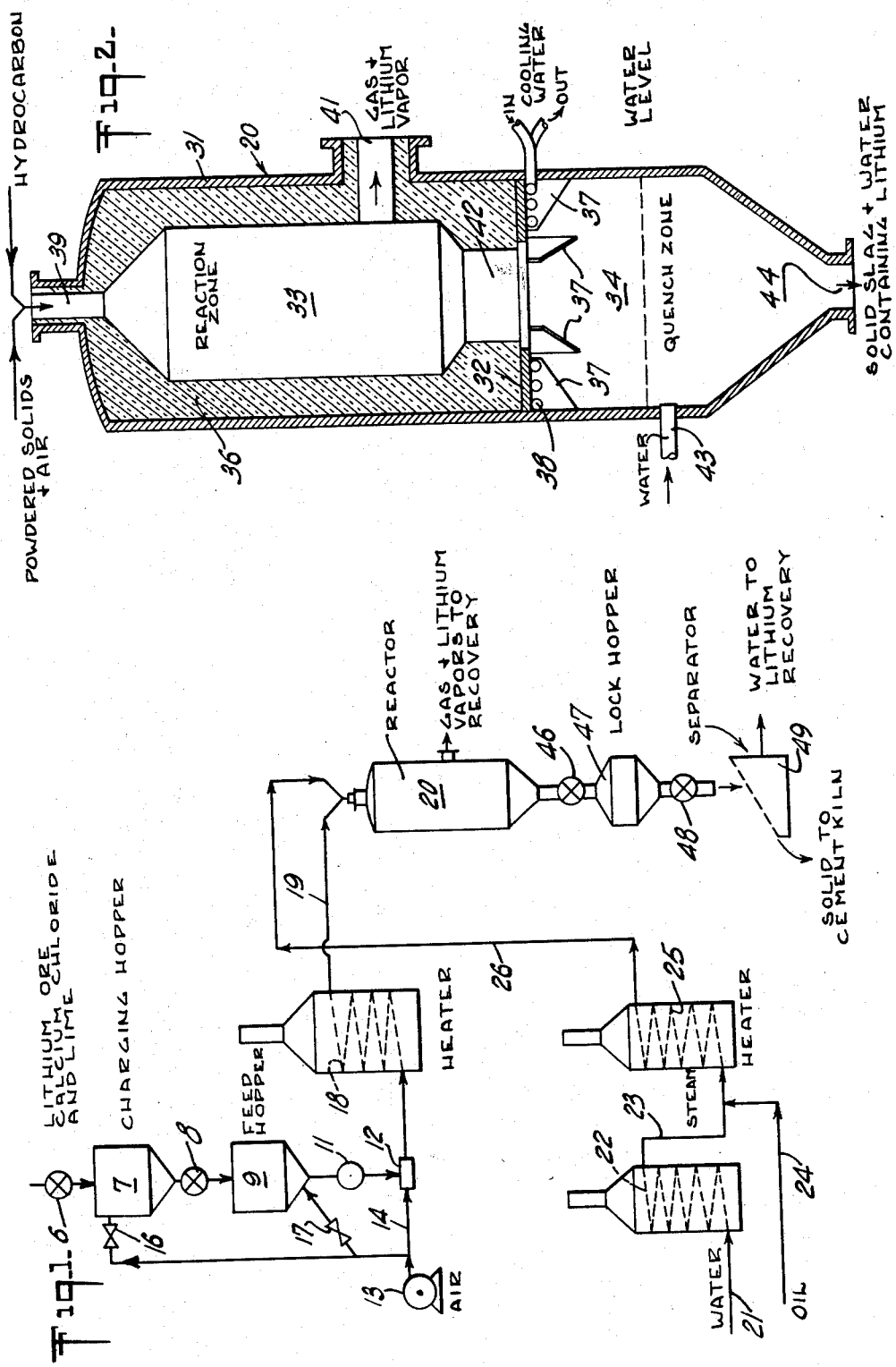

This invention relates to the recovery of lithium from lithium-containing ores. In one of its more specific aspects, it relates to the recovery of lithium from spodumene.

It is known that lithium ores can be roasted with calcium carbonate to convert the lithium to a water soluble salt which can be extracted from the roasted ore by leaching. It is also known that lithium may be recovered from lithium ores, for example, spodumene, by heating a mixture of lime, calcium chloride and the ore under vacuum to a temperature between 800° and 1200° C. thereby forming and vaporizing lithium chloride from the lithium ore. The vaporized lithium chloride is recovered from the effluent gases from the retort by condensation.

By the process of the present invention lithium may be recovered as lithium chloride from a suitable lithium ore without the necessity of retorting under vacuum. The process of this invention comprises mixing a lithium ore, for example, spodumene, in powdered form with powdered calcium chloride and lime and charging the mixture in fine powder form into a reaction chamber into which hydrocarbon and air are simultaneously charged and reacted to produce carbon monoxide and hydrogen. In contrast to conventional processes in which limestone, calcium chloride and spodumene is pelleted, an impalpable powder is preferred for the present process. Solid particles not exceeding 100 microns in average diameter are suitable as feed to the process. Smaller particles, for example, particles of the order of 40 microns in average diameter and smaller, are very suitable and generally preferred. The process may be operated at atmospheric pressure.

In a preferred mode of operation the powdered solid feed materials are dispersed in oxygen-containing gas, suitably air, and the dispersion is preheated and introduced into a compact, unobstructed reaction zone into admixture with a hydrocarbon. The hydrocarbon also is preferably preheated. The various reactants are proportioned to autogenously maintain the temperature in the reaction chamber within the range of about 2,000 to about 2,400° F., preferably in the range 2,000 to 2,200° F. The solid reactants generally remain in the reaction zone for a period of time within the range 1 to 10 seconds. Carbon monoxide and hydrogen produced by the reaction between hydrocarbon and air are withdrawn from the reaction zone together with lithium chloride vapors formed in the reaction zone. Lithium chloride is condensed from the gas stream. Solid residue, either in the form of clinkers or fluid slag, is separately discharged from the reaction zone. The solid is collected in water in the form of small pieces of slag and withdrawn from the reactor for further processing. Lithium which is present in the ore and which remains unvaporized in the reactor is converted at least partially to a water-soluble salt of lithium which is extracted from the solid residue by leaching. Small amounts of powdered solids are entrained in the gas stream and separately recovered.

Beta-spodumene formed by heating spodumene ore to about 2,000° F. to render it more friable is a preferred lithium-containing ore suitable for use in the present process. Other lithium-containing ores, for example, petalite, eucryptite, lepidolite and ambylgonite, may be processed in accordance with this invention. These may be mixed or treated separately. Lime may be added as calcium oxide or calcium carbonate. Sand may also be added when necessary to increase the silica content of the mixture. Silica, which occurs to a greater or lesser extent in various lithium ores, particularly eucryptite, petalite, and spodumene, apparently aids in the formation of lithium chloride in the process. A concentrated lithium ore, i.e. one that has been beneficiated by the removal of quartz, lithium-poor mica, and feldspar, is preferred as feed to the process. Lithium ore, preferably dry, is pulverized and mixed with pulverized lime and anhydrous calcium chloride, the entire mixture preferably having a size range such that it will all pass through a 200 mesh screen (Tyler standard Screen Scale or U.S. Bureau of Standards, Standard Screen Series, 1919), as charge for the process.

Volatilized lithium chloride, which appears in the gas stream from the reaction chamber, is recovered by condensation of the lithium chloride vapor after which the lithium chloride may be recovered from the solid condensate product by any of various well known means. One method of recovery of lithium chloride, for example, is by leaching the solids recovered from the gas stream with water, concentrating the solution, and recovery of lithium from the concentrated solution. Alternatively, lithium chloride may be extracted from the crude condensate by means of alcohol, e.g., ethyl alcohol, thereby recovering lithium chloride directly. The lithium values contained in the aqueous solution resulting from aqueous extraction of the condensed lithium chloride may be recovered as the carbonate, silicate, hydroxide, phosphate, or fluoride. The hydroxide results on complete vaporization of the water from the aqueous solution obtained on leaching, while other salts of lithium may be obtained by precipitation with suitable reagents, for example, carbon dioxide, and sodium carbonate. The residue from the reactor also contains lithium in water-soluble form. This residue is dropped at the temperature of the reaction zone directly into water which disintegrates the sintered particles into small pieces and, at the same time, leaches soluble lithium salts from the clinker. The clinker may be pulverized and further extracted. The extract may be processed for the recovery of lithium as described above. Powdered solid reactants carried away from the reaction zone in the gas stream may be recycled to the system.

The following detailed description, together with the accompanying drawings illustrates a preferred mode of carrying out the process of this invention. FIG. 1 of the drawings is a diagrammatic view illustrating one arrangement of apparatus for carrying out the process of the present invention. FIG. 2 is an elevational view in cross-section of a preferred form of reactor for carrying out the process of this invention.

With reference to FIG. 1 of the drawings, lithium ore, e.g. spodumene, mixed with calcium chloride, and optionally also with sand, or lime, or both, all in finely powdered form, is admitted through valve 6 into charging hopper 7. From the charging hopper, the solid mixture is admitted through valve 8 into feed hopper 9. From the feed hopper, the powdered solid mixture passes through a feed rate controller 11 into a jet mixing device 12. Air from a suitable blower-compressor 13 is admitted through line 14 to mixing device 12. Air may be admitted to charging hopper 7 through line 16 and to feed hopper 9 through line 17 in order to build up a pressure in the hoppers equivalent to that required to force the solid feed material through the piping to the reaction zone described hereinafter.

The mixture of powdered solid materials suspended in air is passed at relatively high velocity through a heating coil 18 wherein the powdered solid and air are preheated. The preheated dispersion of powdered solid reactants in air is passed through line 19 and discharged into reactor 20, wherein the air is reacted with either gaseous or liquid hydrocarbon in an amount sufficient to maintain the temperature in the reactor within the range of 2,000 to 2200° F. For the purpose of illustration, hydrocarbon oil will be used as the hydrocarbon fuel in this specific example.

Water from line 21 passes through heating coil 22 wherein it is converted to steam and the steam delivered through line 23. Liquid oil from a suitable source is admitted at a controlled rate through line 24 and injected into the stream of steam in line 23. The mixture of oil and steam is passed through tubular heater 25 in which an intimate dispersion of oil particles in steam is developed by passage of the mixture through a long tubular zone at relatively high velocity. The highly turbulent flow in the tubular heating zone thoroughly and evenly disperses the oil droplets in the steam. The resulting heated steam-oil dispersion passes through line 26 to the reactor 20 where it is mixed with the solid-air dispersion from line 19 in a suitable mixer burner and charged directly into reaction zone 20.

The reactor 20, illustrated in more detail in FIG. 2, comprises an outer cylindrical steel shell 31 divided by a partition 32 into a reaction zone 33 and a slag quench zone 34. The portion of shell 31 above the partition 32 is provided with a refractory liner 36 to protect the wall of the vessel from overheating. Partition 32 is supported by plates 37 and is protected from overheating by cooling coil 38.

The dispersion of powdered solids in oxygen-containing gas are admitted to the reaction chamber 33 through an inlet 39. Preferably the oxygen containing gas, carrying suspended solids, is admixed with the hydrocarbon at the point of introduction of the solids to the reaction zone. Product gas, containing lithium chloride vapor, is discharged through outlet port 41 and passed to lithium chloride recovery operations not illustrated.

Solid residue or slag from the reaction zone is discharged through slag outlet 42 into the slag quench zone 34 in which a body of water is constantly maintained. Water is introduced into the slag quench zone through line 43 and is maintained at a level somewhat below partition 32. The slag or solid residue may be molten or in clinker form. When molten slag from reaction zone 33 contacts the water it is simultaneously solidified and disintegrated into small pieces which may be readily removed from the quench zone. Particles of solid residue in water are drawn from the quench zone through outlet 44. The residual solid and water from the quench zone preferably is drawn through valve 46 into a lock hopper 47 (FIG. 1) from which it may be discharged through line 48 to a separator 49. Water from separator 49 contains soluble lithium compounds and may be processed for the recovery of lithium as described above. The solid residue is suitable for the production of cement.

The following examples illustrate operation of this invention for the recovery of lithium as lithium chloride from beneficiated spodumene ore with the production of cement clinker as an important product of the process.

*Example 1*

Los Angeles Basin crude residium of 16.4° API gravity with a gross heating value of 18,525 B.t.u.'s per pound is dispersed in steam in proportions of 0.25 pound of steam per pound of oil and preheated to 800° F. and charged at the rate of about 3650 pounds of oil per hour into a cylindrical reactor having a reaction space of about 50 cubic feet. Spodumene ore of the following composition is treated by this process:

Wt. percent
$Li_2O$ ------------------------------------------------ 6.3
$SiO_2$ ------------------------------------------------ 58.6
$Al_2O_3$ ---------------------------------------------- 33.1
Other ------------------------------------------------- 2.0

This ore is pulverized to minus 200 mesh, and blended with sand, pulverized (−200 mesh) limestone containing 98 percent calcium carbonate by weight and with powdered calcium chloride containing 77 weight percent calcium chloride, 2 percent magnesium chloride, 19 percent water and 2 percent other calcium salts. The solids are mixed in relative proportions to yield a clinker suitable for Portland cement:

Lbs.
Limestone ---------------------------------------------- 1557
Calcium chloride --------------------------------------- 68
Sand (98% $SiO_2$) -------------------------------------- 148
Spodumene --------------------------------------------- 227

The solid mixture is fed at the rate of one ton (2,000 pounds) per hour into air supplied at the rate of 258,800 standard cubic feet (atm. pres. and 60° F.) and the dispersion passed through a tubular heater where it is preheated to 980° F. and supplied to the reaction zone into admixture with the separately preheated stream of oil and steam.

The reaction between air, steam and hydrocarbon autogenously maintains the reactor temperature at about 2200° F. Lithium chloride of 97 weight percent purity is recovered by condensation from the effluent gas stream.

The effluent gas is scrubbed with water containing sodium carbonate effecting removal of carbon dioxide, carbonyl sulfide and hydrogen sulfide, producing a fuel gas having a gross heating value of 145 B.t.u's per standard cubic foot. The by-product gas compositions are given below:

|  | Gas as Produced, vol. percent | Scrubbed Gas, volume percent |
| --- | --- | --- |
| Hydrogen | 19.4 | 21.2 |
| Water | 5.8 | |
| Carbon monoxide | 22.0 | 24.0 |
| Carbon dioxide | 2.5 | |
| Nitrogen | 50.3 | 54.8 |

Cement clinker of the following approximate analysis is produced as a product of the process.

Wt. percent
CaO --------------------------------------------------- 69.5
MgO --------------------------------------------------- 1.0
$SiO_2$ ------------------------------------------------ 22.8
$Al_2O_3$ ---------------------------------------------- 6.4
Other ------------------------------------------------- 0.3

*Example 2*

When oxygen is substituted for air in the foregoing example, the fuel oil required is reduced to about 2,730 pounds per hour, while the ozygen (95.1 volume percent purity) requirement is about 35,360 standard cubic feet per hour. Synthesis gas, i.e. a mixture of hydrogen and carbon monoxide, is an important product of this process. After processing for removal of water, carbon dioxide and sulfur compounds, the synthesis gas of the following composition is produced at the rate of about 139,300 standard cubic feet per hour.

Volume percent
Hydrogen ---------------------------------------------- 47.6
Carbon monoxide --------------------------------------- 51.0
Nitrogen and argon ------------------------------------ 1.4

Other products of the process remain substantially unchanged.

Obviously, many modifications and variations of the

I claim:

1. In a process for the treatment of lithium ore for the recovery of lithium values therefrom wherein a mixture comprising lithium ore, lime and calcium chloride are heated to a temperature above 2,000° F. effecting evolution of lithium chloride vapor therefrom and production of a solid residue containing lithium compounds of increased solubility, the improvement which comprises forming a dispersion of said mixture in powdered solid form in air; charging said dispersion into a flow type reaction zone wherein solids are substantially completely suspended and entrained in gaseous reactants and reaction products into intimate admixture with a hydrocarbon in relative proportions effecting partial combustion of said hydrocarbon in the presence of said entrained solids at an autogenous temperature above 2,000° F. with the production of carbon monoxide and hydrogen and simultaneous reaction of powdered solids in suspension entrained in gaseous reactants and resulting reaction products for a period of time within the range of 1 to 10 seconds; withdrawing product gas containing carbon monoxide, hydrogen and lithium chloride vapor; recovering lithium chloride from said product gas; discharging hot solid residue from said reaction zone into contact with water, effecting quick cooling of said solids and solutions of solid lithium salts from said solid residue; and recovering lithium values from resulting solution.

2. A process as defined in claim 1 wherein said solid residue is fused in said reaction zone and the resulting slag is discharged from the reaction zone in molten form directly into a body of water.

3. In a process for the treatment of lithium ore for the recovery of lithium values therefrom wherein a mixture comprising lithium ore, lime and calcium chloride are heated to a temperature above 2,000° F. effecting evolution of lithium chloride vapor therefrom, the improvement which comprises charging said mixture in powdered solid form into a flow-type reaction zone wherein solids are substantially completely suspended and entrained in gaseous reactants and reaction products into intimate admixture with oxygen-containing gas and hydrocarbon in relative proportions effecting partial combustion of said hydrocarbon in the presence of said entrained solids at an autogenous temperature above 2,000° F. with the production of carbon monoxide and hydrogen and at a rate such that said powdered solids are suspended and wholly entrained in gaseous reactants and resulting reaction products whereby powdered solid is carried in said gases and reacted for a period of time within the range of 1 to 10 seconds to form lithium chloride which is liberated as vapor during the passage of said solid materials through said reaction zone; discharging product gas comprising carbon monoxide, hydrogen and lithium chloride vapor from said reaction zone; withdrawing ungasified residue from said solid materials from said reaction zone; and recovering lithium chloride from said product gas.

4. A process according to claim 3 wherein said lithium ore is spodumene.

5. A process according to claim 3 wherein said oxygen-containing gas is substantially pure oxygen.

6. A process as defined in claim 3 wherein said solid residue is fused in said reaction zone and the resulting slag is discharged from the reaction zone in molten form directly into a body of water.

References Cited in the file of this patent

UNITED STATES PATENTS

| | | |
|---|---|---|
| 1,186,522 | Ellis | June 6, 1916 |
| 2,022,003 | Kepfer et al. | Nov. 26, 1935 |
| 2,469,989 | Pyzel | May 10, 1949 |
| 2,533,246 | Hayes et al. | Dec. 12, 1950 |
| 2,561,439 | Erasmus | July 24, 1951 |
| 2,627,452 | Cunningham | Feb. 3, 1953 |
| 2,662,809 | Kroll | Dec. 15, 1953 |
| 2,684,896 | Coghlan | July 27, 1954 |
| 2,726,138 | Cunningham | Dec. 6, 1955 |
| 2,793,934 | Cunningham | May 28, 1957 |
| 2,954,274 | Walsh | Sept. 27, 1960 |